US006812314B2

(12) United States Patent
Lunardi et al.

(10) Patent No.: US 6,812,314 B2
(45) Date of Patent: Nov. 2, 2004

(54) THERMALLY RESPONSIVE POLYMER MATERIALS AND USES THEREOF

(75) Inventors: Gilberto Joao Lunardi, New Holland, PA (US); Christopher D. Batich, Gainesville, FL (US); Jorge Jardim Zacca, Porto Alegre (BR); Kenneth Ray Berger, Gainesville, FL (US); Steven Sargent, Archer, FL (US)

(73) Assignee: University of Florida, Gainesville, FL (US)

( * ) Notice: Subject to any disclaimer, the term of this patent is extended or adjusted under 35 U.S.C. 154(b) by 74 days.

(21) Appl. No.: 09/981,183

(22) Filed: Oct. 17, 2001

(65) Prior Publication Data

US 2003/0072849 A1 Apr. 17, 2003

(51) Int. Cl.[7] .............................................. C08F 210/00
(52) U.S. Cl. ................ 526/348; 526/348.2; 526/348.3; 526/348.4; 526/348.5; 526/348.6; 526/351; 428/35.2
(58) Field of Search .............................. 526/348, 348.2, 526/348.3, 348.4, 348.5, 348.6, 351; 428/35.4

(56) References Cited

U.S. PATENT DOCUMENTS

| | | | |
|---|---|---|---|
| 4,255,376 A | * | 3/1981 | Soehngen .................... 264/145 |
| 4,830,855 A | | 5/1989 | Stewart |
| 5,051,481 A | | 9/1991 | Taka et al. |
| 5,102,955 A | | 4/1992 | Calabro et al. |
| 5,254,354 A | * | 10/1993 | Stewart ....................... 426/106 |
| 5,284,886 A | | 2/1994 | Reilly et al. |
| 5,387,450 A | | 2/1995 | Stewart |
| 5,491,019 A | | 2/1996 | Kuo |
| 5,665,822 A | | 9/1997 | Bitler et al. |
| 5,685,128 A | | 11/1997 | Chum et al. |
| 5,783,302 A | | 7/1998 | Bitler et al. |
| 5,840,807 A | | 11/1998 | Frey et al. |
| 5,888,597 A | | 3/1999 | Frey et al. |
| 5,958,319 A | | 9/1999 | Brant |
| 6,086,967 A | | 7/2000 | Whiteman et al. |
| 6,232,402 B1 | | 5/2001 | Demeuse |

FOREIGN PATENT DOCUMENTS

| | | |
|---|---|---|
| WO | WO 93/02130 A1 | 2/1993 |
| WO | WO 94/08992 A1 | 4/1994 |

OTHER PUBLICATIONS

Lunardi, G., "Thermal and Permeation Properties of Poly(ethene–CO–1–alkene)s", Doctoral Dissertation, University of Florida, shelved in Marston Science Library between Feb. 2001 and May 2001.*

Lunardi, G. "Thermal and Permeation Properties of Poly(ethene–CO–1–Alkene)s" Doctoral Dissertation, University of Florida, confidentially held (via petition) by University of Florida Graduate School until shelved in Marston Science Library between Feb. 2001 and May 2001.

* cited by examiner

Primary Examiner—William K. Cheung
(74) Attorney, Agent, or Firm—Saliwanchik, Lloyd & Saliwanchik

(57) ABSTRACT

The subject invention pertains to branched polyolefin materials that exhibit temperature-sensitive permeability. The subject invention also concerns a package including a polymer material that exhibits temperature-sensitive permeability and separates a respiring article from the surrounding atmosphere. Methods of the subject invention involve placing a respiring article within a container comprising a polymer material exhibiting temperature-sensitive permeability.

8 Claims, 8 Drawing Sheets

THERMALLY RESPONSIVE POLYMER MATERIALS AND USES THEREOF

BACKGROUND OF INVENTION

Prior to the discovery of polymers, packaging materials included paper, glass, and metal; materials which were often ineffective and costly in the storage and transfer of perishable foods. The implementation of polymers into packaging materials tremendously improved the preservation of perishable foods. In addition, with improved biological control and faster and better means of transportation, the availability of perishable food products in general is no longer tied to a geographical area, or to seasonal factors.

Generally, the materials used to contain, protect, preserve, and inform the consumer play a critical role in the sale of perishable products. Often, desirable polymer properties in packaging films are those of barrier to oxygen, carbon dioxide, and moisture. However, with perishable food products such as fresh fruits, vegetables, and cut flowers, which contain living cells that respire, transpire, and conduct other metabolic processes long after their harvest, a desirable polymer film provides high, adjustable transmission rates of oxygen, carbon dioxide, and moisture. Respiration and transpiration are the main processes that affect the atmospheric composition inside a package. Ideally, moisture should be retained just to the extent to avoid condensation when temperature changes occur (for example, when the package is placed inside a refrigerator). Respiration and transpiration are regulated by temperature. As a general rule, for every 10° C. increase in temperature, the respiration and transpiration rates are doubled or tripled. Also, an exchange of carbon dioxide and oxygen with the environment has to take place if the produce continues the respiration process.

One of the difficulties with post-harvest preservation of produce is that each product has specific needs. Some respire faster than others and the same produce will respire at different rates, depending on the part of the plant, elapsed-time after harvest, growing season, growing conditions, area of production, type of cultivar, etc. Those that respire faster require more refrigeration than those that have slower metabolic rates. For example, asparagus respires ten (10) times faster than a tomato and an apple maintained at 20° C. ripens three (3) times faster than one kept at 10° C. Also, the faster a product respires, the greater the rate of sugar consumption, and the greater the amount of heat generated. Thus, refrigeration is essential for preservation because water and sugar loss critically affect the quality of any produce. Therefore, the storage life of perishable products varies inversely with respiration.

After refrigeration, the most important resource for the extension of produce shelf-life is the use of modified atmosphere packaging (MAP). Upon harvest and packaging for storage, perishable goods must be immediately conditioned for longer preservation. Active atmospheric control is done by packing the product in bags that are filled with an "optimum composition" of oxygen and carbon dioxide, and balanced with nitrogen. The optimum composition for each product is the atmospheric composition that is adjusted to the respiration rates of the produce at a given temperature (i.e. neither more nor less than what the product needs). For this initial composition to be maintained for a long time, the gas permeation rates of the bag should be matched to the product needs. In this aspect, both the material and the physical design of the packaging play a role. MAP technology is extremely dependent on the flexibility of film permeation rates when applied to different produce and combinations of produce inside a single package. Unless the barrier provided by the packaging matches permeation rates with content respiration rates, an imbalance builds up, accelerating aging and facilitating bacterial or fungal growth.

There are packaging films for perishable foods currently available that exhibit variable gas permeation based on temperature. U.S. Pat. No. 5,254,354 describes packaging films composed of side chain crystallizable (SCC) acrylate polymers that exhibit temperature-sensitive gas permeability. Polyethylenes were included among a list of various polymers described as unsuitable for use as thermally responsive packaging material, based upon the resulting film's poor gas permeability response to temperature.

U.S. Pat. No. 5,665,822 discloses elastomers containing side chain crystalline blocks that exhibit increased permeability to oxygen and carbon dioxide when their crystalline side chains reach their melting point. These elastomers are prepared by polymerizing acrylates to form polymer blocks having crystalline side chains of either polymethylene moieties or perfluorinated ethylene moieties and linking these polymer blocks with other polymer blocks consisting of polyalkanes.

Additional films exhibiting gas permeability characteristics are disclosed in U.S. Pat. No. 5,685,128 (the '128 patent) and U.S. Pat. No. 5,958,319 (the '319 patent). The '128 patent discloses packaging films composed of a "substantially linear" ethylene polymer and polymer blends of substantially linear ethylene polymer with homogenously branched ethylene polymer to provide increased oxygen permeability. The '319 patent discloses methods for producing polyethylene films using metallocene catalyst systems. By manipulating various processing parameters, these films exhibit improved gas transmission rates at a given polyethylene resin density.

Current materials used to make packaging films for fresh produce are often composed of polyolefin polymers, such as polyethylenes. These perishable food packaging films exhibit only gradual changes in permeability as a function of temperature. As simple hydrocarbon polymers, polyolefin films are relatively simple to synthesize and process; however, it has been difficult to establish successful permeation control in polymers of the polyolefin family. Therefore, there remains an unfulfilled need for polyolefin films that exhibit sharp permeability transitions based on variation in temperature.

BRIEF SUMMARY OF THE INVENTION

The present invention concerns polymer materials which exhibit temperature-sensitive permeability. The polymer materials of the subject invention are particularly useful for packaging goods or articles that require gas exchange for optimum shelf life, e.g., fresh vegetables, fruit, and cut flowers.

The subject invention is at least partly based on the surprising discovery that polyolefins containing a high concentration of short branches exhibit temperature sensitive permeability properties that make them useful for a variety of applications where control of permeability is desirable. In a preferred embodiment, the polymer materials of the subject invention contain a high concentration of branches of about ten carbon atoms in length or less. Preferably, the polymer materials of the subject invention contain about 50% to about 100% α-olefin by weight. Olefins utilized in the subject invention are preferably between about four and about twelve carbon atoms per molecule, thereby producing branches of between about two and about ten carbon atoms in length.

Appropriate α-olefins include, for example, 1-butene, 1-pentene, 1-hexene, 1-heptene, 1-octene, 1-nonene, 1-decene, 1-undecene, and 1-dodecene. Preferably, the α-olefins are selected from the group consisting of 1-butene, 1-hexene, 1-octene, 1-decene, and 1-dodecene. More preferably, the polymer materials are α-olefin/ethene copolymers selected from the group consisting of ethene-1-butene, ethene-1-hexene, ethene-1-octene, ethene-1-decene, and ethene-1-dodecene.

The subject invention also concerns polyolefin films particularly useful for packaging perishable foods that require gas exchange. The polymer films of the subject invention have been shown to exhibit gas and water vapor permeabilities that are very sensitive to changes in ambient temperature. Therefore, these materials could be considered so-called "smart" materials that adjust permeation properties according to environmental changes.

The polymer materials of the subject invention can be formulated into various containers, such as bags, particularly suited for packaging fresh vegetables, fruits, or cut flowers. The polymer materials of this invention could be useful in some post harvest techniques for preservation of produce. In Modified Atmosphere Packaging (MAP) for example, the produce is placed inside a packaging article in the presence of atmospheric gases, such as oxygen, carbon dioxide and nitrogen, in concentrations that are known to extend the shelf life of the packaged product.

The polymer materials of the subject invention can be used to extend the preservation of fresh produce, reducing losses by spoilage during handling and storage, and extending the period of marketability. Improvement of the quality of the produce is also expected, since better preservation means ultimately that more nutrients and water contents, higher crispness, better freshness, color and flavor could be maintained for longer periods of time.

The subject invention also pertains to a package comprising a polymer material of the subject invention and an article, wherein the polymer material separates the article from the surrounding atmosphere. The subject invention also concerns methods for packaging articles by placing the article within a container composed of a polymer material of the subject invention. The polymer materials of the subject invention are particularly useful for packaging respiring articles that would benefit from gas exchange.

The subject invention also pertains to clothing, drug delivery devices, and ocular devices formulated from the polymer materials of the subject invention.

DETAILED DISCLOSURE OF THE INVENTION

Figure 1:
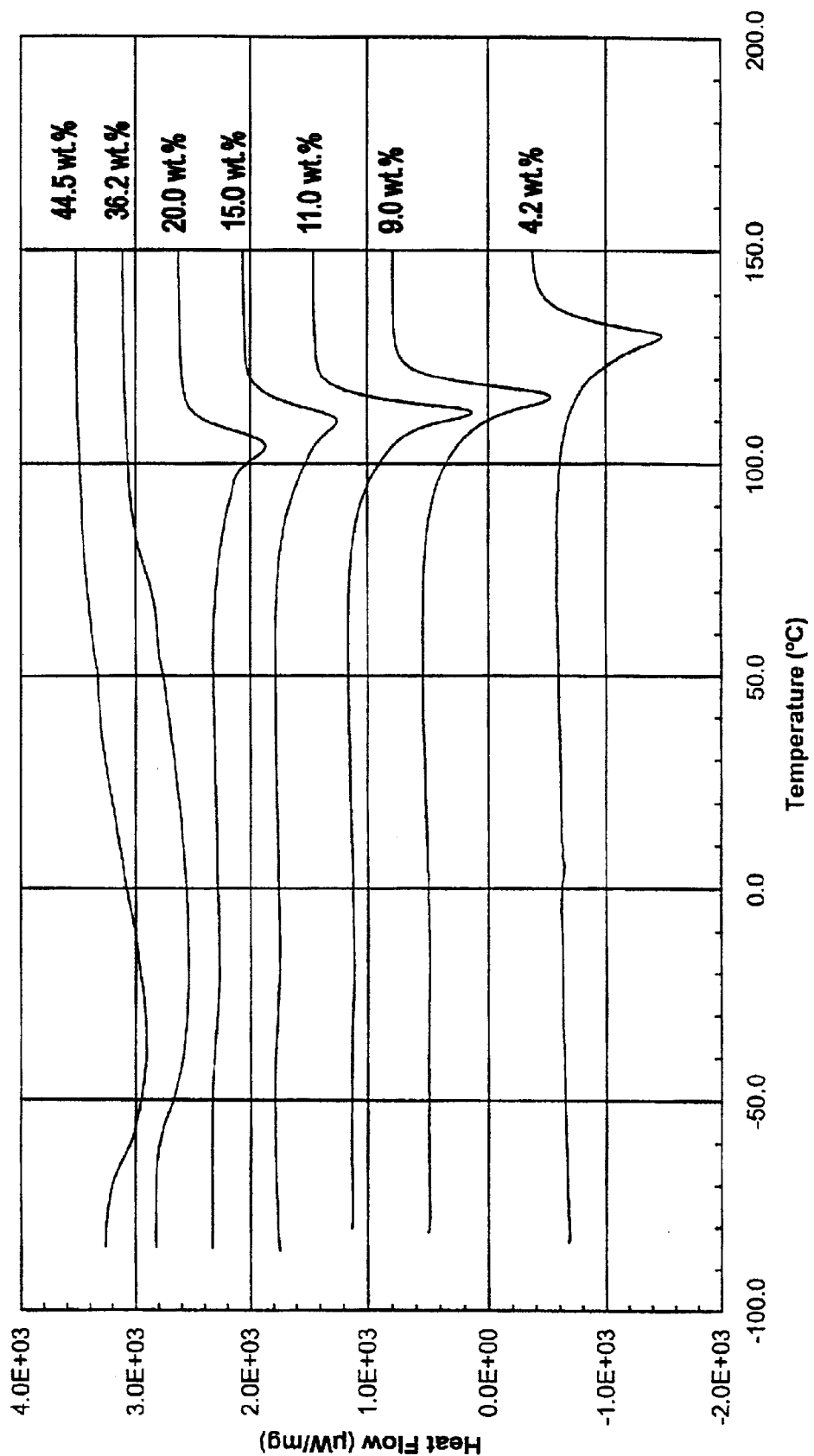
FIG. 1 shows DSC heating curves of ethene-1-decene copolymers (heating at 10° C./min.).

The present invention concerns branched polymer materials which exhibit temperature-sensitive permeability. The subject invention is at least partly based on the surprising discovery that polyolefins containing a high concentration of short branches, exhibit temperature sensitive permeability properties that make them useful for a variety of applications where control of permeability is desirable. Specifically, it was found that permeability coefficients to oxygen and carbon dioxide in polyolefin-based materials are not only affected by monomer content, but also depend on the type (e.g., length) of branches present. In addition, highly branched copolymers, which develop side chain crystallinity, exhibit permeation properties that are much more sensitive to temperature than their unbranched counterparts.

The oxygen permeabilities exhibited by the polymer materials of the subject invention increase substantially over a temperature range of about 10° C., within the temperature range of about 0° C. to about 40° C. These increases in oxygen permeability (e.g., 1-fold, 1.5-fold, two-fold, three-fold, and more) depend upon the amount and type of olefin monomer used to produce the polymer material. These sharp permeability transitions are extremely advantageous for the Modified Atmosphere Packaging (MAP) industry. The polymer materials of the subject invention can be tailored such that the permeability to a particular gas (e.g., oxygen, carbon dioxide, water vapor) is reached at a particular temperature or range of temperatures, depending upon the specific application.

The polymer materials of the subject invention can be a homopolymer containing only α-olefin monomeric units, or a copolymer containing equal amounts of α-olefin comonomer and another monomer, or a copolymer where the α-olefin predominates. In one embodiment, the polymer material comprises a copolymer containing α-olefins and ethylene.

In a preferred embodiment, the polymer materials of the subject invention are polyolefins containing a high concentration of branches of about ten carbon atoms in length or less. Preferably, the percent content of α-olefin within the polymer material is about 50% to about 100%. The α-olefins utilized in the subject invention are preferably between about four and about twelve carbon atoms per molecule, thereby contributing two carbons to the polymer backbone and producing branches of between about two and about ten carbon atoms in length. Appropriate α-olefins include, for example, 1-butene, 1-pentene, 1-hexene, 1-heptene, 1-octene, 1-nonene, 1-decene, 1-undecene, and 1-dodecene. Preferably, the α-olefins are selected from the group consisting of 1-butene, 1-hexene, 1-octene, 1-decene, and 1-dodecene. More preferably, the polymer materials are α-olefin/ethene copolymers selected from the group consisting of ethene-1-butene, ethene-1-hexene, ethene-1-octene, ethene-1-decene, and ethene-1-dodecene.

As used herein, the term "α-olefin" is intended to mean a linear hydrocarbon having one carbon-carbon double bond that is located at the end of the linear chain. Examples include ethylene (or ethene) and polypropylene.

As used herein, the term "monomer" refers to a molecule or compound which can react to form a polymer by combination with itself or with other molecules or compounds.

As used herein, the term "comonomer" refers to a monomer which is copolymerized with at least one different monomer, directly or indirectly, in a copolymerization reaction, the result of which is a copolymer.

As used herein, the term "polymer" refers to the product of a polymerization reaction, and is inclusive of homopolymers, copolymers, terpolymers, and so forth.

As used herein, the term "homopolymer" refers to a polymer resulting from the polymerization of a single monomer, i.e., a polymer containing a single type of repeating unit.

As used herein, the term "copolymer" refers to polymers formed by the polymerization of at least two different monomers. For example, the term "copolymer" includes the copolymerization reaction of product of ethylene and an α-olefin, such as 1-hexene. However, the term "copolymer" is also inclusive of, for example, the copolymerization of a mixture of ethylene, propylene, 1-hexene, and 1-octene.

As used herein, a copolymer identified in terms of a plurality of monomers, e.g., "α-olefin/ethylene copolymer," refers to a copolymer in which the first listed monomer copolymerizes in about an equal or higher weight percent than the second listed monomer and, for copolymers which are terpolymers, the first monomer copolymerizes in a higher weight percent than the second monomer, and the second monomer copolymerizes in a higher weight percent than the third monomer, and so forth.

As used herein, terminology employing a "/" with respect to the chemical identity of a copolymer (e.g., "an α-olefin/ethylene copolymer"), identifies the comonomers which are copolymerized to produce the comonomer. This terminology, as used herein, refers to the primary comonomer first, followed by the secondary comonomer.

As used herein, the term "homogenous polymer" refers to polymerization reaction products of relatively narrow molecular weight distribution and relatively narrow composition distribution. Such polymers exhibit a relatively narrow molecular weight distribution and relatively narrow composition distribution. Such polymers exhibit a relatively even sequencing of comonomers within a chain, a similarity in length of all chains, and are typically prepared using metallocene, or other stereospecific catalysts.

As used herein, the phrase "heterogenous polymer" refers to polymerization reaction products of relatively wide variation in molecular weight and relatively wide variation in composition distribution, i.e., polymers made, for example, using conventional Ziegler-Natta catalysts. Such polymers typically contain a relatively wide variety of chain lengths and comonomer percentages.

The polyolefins utilized can be pure or used in combination with other polymers in order to have an adequate combination of properties. The polymer films of the subject invention can be synthesized with catalysts of the same type already used in some industrial processes to make polyolefin polymers (Ziegler-Natta, Phillips or metallocene).

The polymer materials of the subject invention can contain homopolymers of α-olefin monomers. Alternatively, the polymer materials of the subject invention can contain various types of copolymers, such as alternating copolymers, where an α-olefin monomer and another type of monomer are arranged in an alternating fashion. The polymer materials of the subject invention can include random copolymers, where α-olefin monomers are arranged in no particular sequential order. Alternatively, the polymer materials of the subject invention can comprise block copolymers or graft copolymers. In the various embodiments, the α-olefin monomers can be of different lengths, or the same length.

The polymer materials of the subject invention can be formulated as films, for example, which are particularly useful for packaging perishable foods that require gas exchange. The polymer films of the subject invention have been shown to exhibit gas (e.g., oxygen and/or carbon dioxide) and water vapor permeabilities that are very sensitive to changes in ambient temperature. Therefore, these materials could be considered so-called "smart" materials that adjust permeation properties according to environmental changes.

The polymer materials of the subject invention can be formulated into various containers, such as bags, particularly suited for packaging fresh vegetables, fruits, or cut flowers. The polymer materials of this invention can be useful in some post harvest techniques for preservation of produce. To achieve Modified Atmosphere Packaging (MAP), for example, the produce can be placed inside a container, formulated from a polymer material of the subject invention, in the presence of atmospheric gases, such as oxygen, carbon dioxide and nitrogen, in concentrations that are known to extend the shelf life of the packaged product. Therefore, the polymer materials of the subject invention can be used as packaging to extend the preservation of fresh produce, reducing losses by spoilage during handling and storage, and extending the period of marketability. Improvement of the quality of the produce is also expected, since better preservation means ultimately that more nutrients and water contents, higher crispness, better freshness, color and flavor could be maintained for longer periods of time.

In one embodiment of the subject invention, the polymer material includes linear chain poly(ethene-co-1-alkene)s. Linear chain poly(ethene-co-1-alkene)s can be synthesized in several well-established ways, such as the Ziegler-Natta method, the Phillips method, or by single-site catalysts. In another embodiment, the polymer material of the subject invention comprises α-olefins, wherein the branches of the polymer contain only hydrocarbons. In another embodiment, the polymer material of the subject invention comprises α-olefins, wherein the backbone and branches of the polymer contain only hydrocarbons.

The determination of branches in the polymers of the subject invention can be performed, for example, using Fourier transform infrared spectroscopy by ASTM D-2238. Such methods determine the overall methyl content.

In another embodiment, the polymer material of the subject invention is a copolymer containing α-olefin and a different comonomer. The α-olefin copolymers can be synthesized, for example, with a racemic mixture of the stereo-specific metallocene catalyst bis-cyclopentadienyl zirconocene dichloride ($Cp_2ZrCl_2$), using methyl aluminoxane (MAO) as a co-catalyst. MAO can be used in ratios varying from 1500 to 6000 parts per part of metallocene.

Preferably, the polymer films of the subject invention are produced as high quality films, having no entrapped air bubbles or defects, and medium thickness variation, 10% at most. It is also preferable that the films have a thickness of 25 to 100 $\mu$m, which is the typical range of thickness of commercial films used in flexible packaging. Films of the subject invention can be monolayered or multilayered, and can be easily produced using a variety of processes known in the art, such as extrusion processes, spin casting, and melt pressing.

As used herein, the term "extrusion" refers to the process of forming continuous shapes by forcing a molten plastic material through a die, followed by cooling or chemical hardening. Immediately prior to extrusion through the die, the relatively high-viscosity polymeric material is fed into a rotating screw of variable pitch, which forces it through the die.

As used herein, the term "coextrusion" refers to the process of extruding two or more materials through a single die with to or more orifices arranged so that the extrudates merge and weld together into a laminar structure before chilling, e.g. quenching. Coextrusion can be employed in film blowing, flat film extrusion, and extrusion coating processes.

The subject invention also pertains to packages including an article separated from the surrounding atmosphere by a polymer material of the subject invention. The polymer material can itself enclose the article or cooperate with an additional material or materials to enclose the article, as a package, separating the article from the surrounding atmosphere (e.g., outside the package). The subject invention also concerns methods for packaging articles by placing the article within a container comprising a polymer material of the subject invention.

The polymer material utilized in packages of the subject invention can be formulated as sheet material that is simply wrapped around an article, so that the article is completely enveloped. Other embodiments of the package are contemplated, with the objective being to enclose the respiring article such that the environment within the enclosure (e.g., container), around the respiring article, is completely separated or partitioned (e.g., airtight, other than the permeability provided by the container) from the atmosphere surrounding the enclosure. Therefore, the polymer material provides an environment within the enclosure and around the article that changes with the permeability of the polymer material. For example, sheets of the polymer material can be wrapped around the article, the article can be placed within a closed bag of the polymer material, or the polymer material can be shaped as a cube or rectangular box, and so forth.

Upon packaging a respiring article, the environment within the package, around the respiring article, can include the appropriate concentrations of gases necessary for the desired respiration rate of the particular article (e.g. oxygen, carbon dioxide, nitrogen).

The package can include an additional material that cooperates with the polymer material in enclosing the article. For example, the package can comprise an article, a polymer material, and an additional material, where the polymer material is formulated as one or more patches, windows, or areas surrounded or defined by the additional material, and thereby providing defined areas of permeability. The ratio of surface area between the polymer material of the subject invention and the additional material can be tailored to meet the respiration requirements of the article. The additional material can be paper, non-woven fabric, cardboard, or plastic, for example. Non-woven fabrics include cloths, such as felt, produced from a random arrangement or matting of natural or synthetic fibers held together by adhesives, heat and pressure, or needling, for example. The additional material can be completely impermeable to the surrounding atmosphere, or exhibit some degree of permeability. In another embodiment, the package of the subject invention includes a polymer material and a tray to support the article, where the polymer material is wrapped around the article and the tray.

Respiring articles that can be packaged using the polymer materials of the subject invention include a variety of items benefiting from access to the surrounding atmosphere. The respiring article can be a biological material, such as food items or flowers. Respiring food items include produce, for example. Fruits and vegetables that can be packaged using the polymer materials of the subject invention include, but are not limited to, apples, lettuce, carrots, pears, tomatoes, peaches, plums, broccoli, cauliflower, asparagus, oranges, tangerines, strawberries, artichokes, mangoes, peppers, and bananas, as well as mixtures of thereof.

The polymer materials of the subject invention can also be formulated into clothing that exhibits temperature-sensitive permeability properties. The entire garment can be composed of the polymer material of the subject invention. Alternatively, the garment can be composed of a different material and have one or more patches, windows, or areas thereon which are comprised of the polymer material of the subject invention and provide defined areas of permeability.

The polymer materials of the subject invention can also be used in dermal or transdermal delivery systems for controlled delivery of an active agent. For example, the polymer materials of the subject invention can be formulated into patches for the dermal or transdermal delivery of an active agent, such as a medication. In such systems, the polymer materials of the subject invention can be used as matrix carriers of the medication, or to provide a permeable barrier interposed between the medication and the skin. The permeability of the polymer material then increases when the delivery system is applied and exposed to the increased temperature of the patient's skin or mucous membrane, permitting release and delivery of the active through the polymer film. The medication can be stored in a reservoir, with a layer of the polymer material of the subject invention interposed between the medication and the patient. Alternatively, the medication can be within a carrier material, such as the polymer material of the subject invention. Various designs of adhesive patches are known in the art. Alternatively, the delivery system can be formulated as a bandage for placement over a wound and subsequent delivery of an active agent, such as an antibiotic or anti-inflammatory. The active agent to be delivered can be a liquid, semi-liquid, or gas. Several examples of delivery system designs that can be utilized are described in U.S. Pat. Nos. 5,683,712; 5,827,530; 5,948,433; 5,958,447; 6,010,715; and 6,159,497.

The polymer materials of the subject invention can also be formulated into a permeable ocular device. High permeability to drugs and/or oxygen is preferred in devices that have contact with the eye. In addition, a superior contact and accommodation with the eye is achieved if the material softens upon reaching the temperature of the body. Ocular contact devices have a first surface for contact with the cornea of the eye and a second surface exposed to the atmosphere, and can be adapted to deliver an active agent, correct a particular vision defect and/or for cosmetic purposes. The ocular contact devices of the subject invention are breathable and can accommodate their shape with the curvature of the ocular globe by absorbing heat and equilibrating its temperature with that of the body. Examples of polymer-based ocular contact devices are described in U.S. Pat. Nos. 6,265,465 and 6,296,867.

All patents, patent applications, provisional applications, and publications referred to or cited herein are incorporated herein by reference in their entirety to the extent they are not inconsistent with the explicit teachings of this specification.

Materials and Methods

Synthesis of ethylene-1-alkene copolymers. The copolymers utilized were synthesized with a racemic mixture of the stereo-specific catalyst bis-cyclopentadienyl zirconocene dichloride ($Cp_2ZrCl_2$), using methyl aluminoxane (MAO) as a co-catalyst. MAO was used in ratios varying from 1500 to 6000 parts per part of metallocene. Ziegler-Natta catalysis ($TiCl_4$) was used to synthesize homopolymers of 1-dodecene, 1-tetradecene, 1-hexadecene, and 1-octadecene. The structure of the Ziegler-Natta catalysts and mechanisms of stereospecific polymerization have been described elsewhere (Odian, G., [1990] Principles of Polymerization, $2^{nd}$ Ed., John Wiley & Sons-NewYork). The ethylene and comonomers were purified prior to polymerization according to standard procedures of OPP Petroquimica. Mass catalyst used was around 7 mg, and the ratio MAO/catalyst was 2000. The polymerization was carried out in hexane in a 2 L reactor, at 60° C. The pressure of the ethene was maintained at 2.5 Bar, and the polymerization time was 1 hour. After the reaction, the reactor contents were washed with ethanol and allowed to dry at room temperature. After drying, the polymer intrinsic viscosity and comonomer content were determined. Homopolymers of 1-dodecene, 1-tetradecene, 1-hexadecene, and 1-octadecene were prepared with $TiCl_4$ (Zielger-Natta catalyst), using the liquid monomer as reaction medium.

Figure 2:
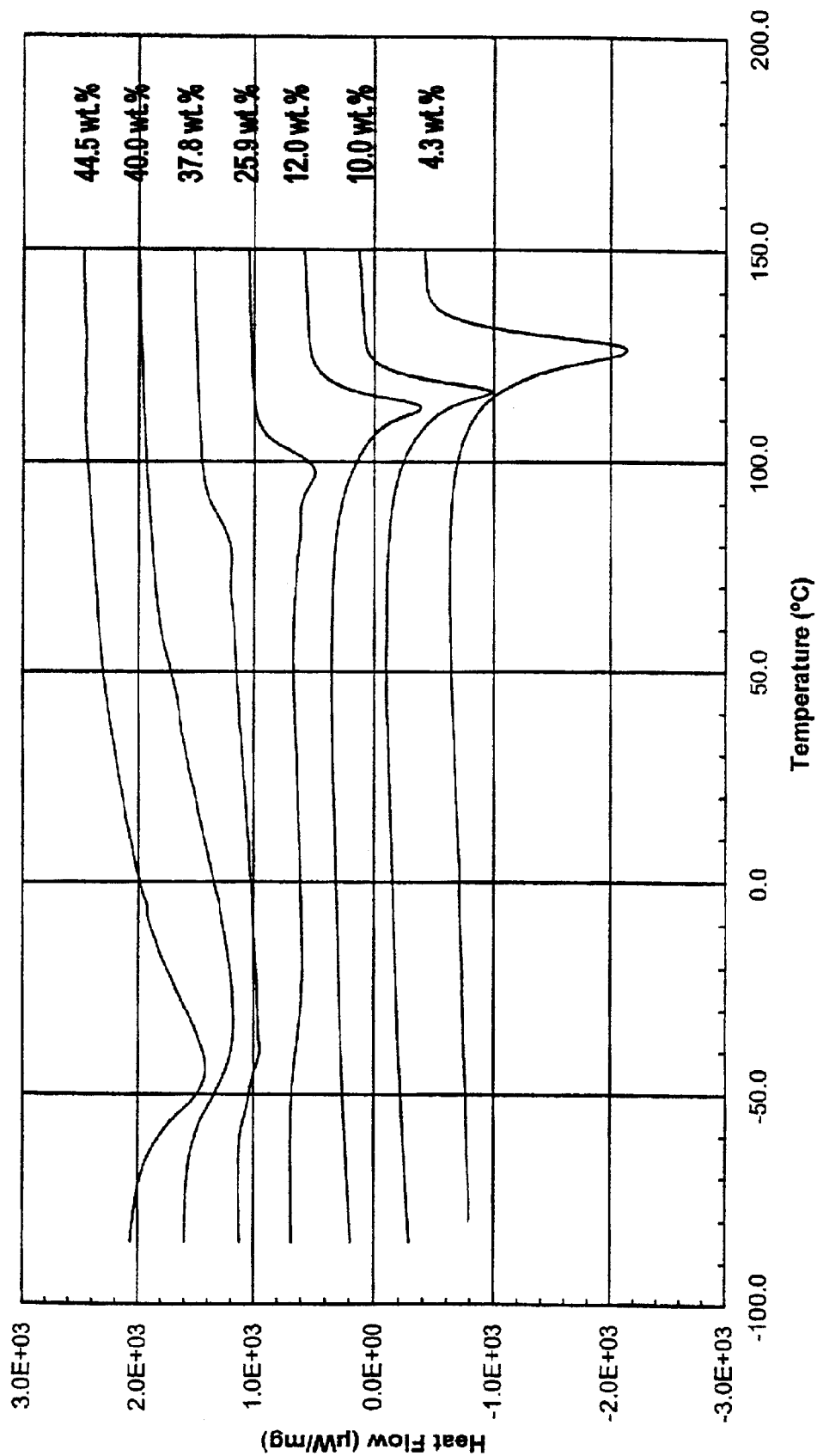
FIG. 2 shows DSC heating curves of ethene-1-dodecene copolymers (heating at 10° C./min.).
Figure 3:
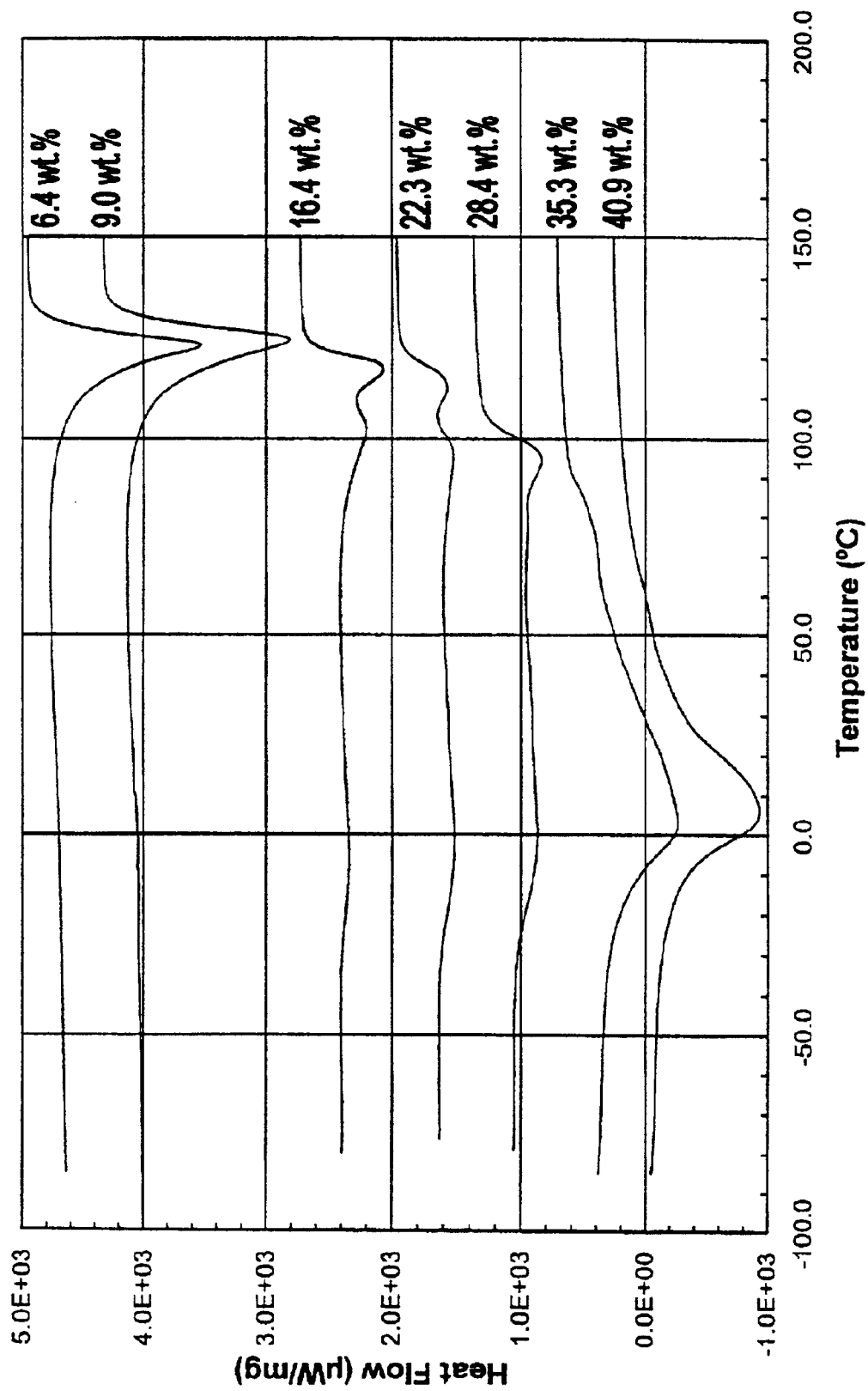
FIG. 3 shows DSC heating curves of ethene-1-hexadecene copolymers (heating at 10° C./min.).

Thermal analysis. Thermal analysis of all the polymers was performed using a Differential Scanning Calorimeter DSC 220 C interfaced with a SEIKO DSM/5600 station. This instrument records the energy necessary to maintain zero temperature difference between the sample and a reference material, as both are subjected to identical controlled heating or cooling conditions inside a controlled atmosphere chamber. The specimens tested were taken from the border of the compressed films intended for permeation. Samples that were not tested from permeation, such as the ones with too low molecular weight to form stable films, were tested as received. Samples were weighed within 0.1 mg in a Denver Instrument Scale model A-200 DS. Approximately 10 mg of material was transferred to a DSC aluminum pan, which was gently crimped and kept under a sealed vial at room temperature until use. What is measured is actually the temperature difference between the reference and the sample. A standard calibration with precise amounts of pure metals (indium and tin), and knowledge of their specific heat capacities allows the conversion of temperature differences to heat flow differences. In the generated DSC curves the ordinate axis corresponds to the heat flow (in $\mu W$), or power difference between the sample and reference pans, and the abscissa can be time or temperature. Using a pan with 10 mg of alumina in powder form as reference, the pan containing the sample was placed on its corresponding platform inside the DSC chamber. A continuous flow of nitrogen gas equal to 100 ml/min was used throughout the test to provide an inert atmosphere inside the chamber. The same temperature sequential program was imposed on all samples: (1) Stabilization at 25° C.; (2) starting at 25° C., heating up to 200° C., at a rate of 20° C./min; (3) stabilization at 200° C. for 3 minutes; (4) cooling from 200° C. to −130° C. at a rate of −10° C./min; (5) stabilization at −130° C. for 10 minutes; (6) heating from −130° C. up to 200° C. at a rate of 10° C./min; and (7) cooling from 200° C. to 25° C. at −10° C./min. A curve produced by an identical run with an empty aluminum pan was subtracted from each thermogram. The DSC curves shown in FIGS. 1–3 were taken from steps 4) (cooling) and 6) (heating). Since the reference material (alumina) does not undergo any thermodynamic transition in the interval of temperatures scanned, the area between a peak and the baseline is proportional to an enthalpy change in the sample. A shift in the level of the baseline was evidence of a change in heat capacity or mass of the sample.

Permeation measurement systems. Three different permeation systems were used to obtain the data presented in the figures. Permeation of the films to oxygen was tested in a commercial partial pressure system, OXTRAN 2/20—ST, manufactured by MOCON Instruments (Minneapolis, Minn.). Permeation to water vapor was measured using a PERMATRAN W 3/30, manufactured by the same company. Permeation to carbon dioxide, nitrogen, and, in a few cases, oxygen was done in a hand-built apparatus using the pressure-rise method (Crank, J. et al., [1968] "Diffusion in Polymers" Academic Press, London and New York). Validation of the hand-built apparatus as a tool for the measurement of permeation coefficients of gases was made through the test of Polyethylene Terephthalate—PET (MYLAR), and two polyethylene films, one a HDPE (PEAD 2407 A from OPP—Triunfo, RS, Brazil) and the other a LLDPE (DOWLEX 2027). These films (except PEAD 2407 A) had their permeation values supplied by the respective manufacturers (E.I. DuPont de Nemours, Wilmington, Del., and Dow Chemical Company, Midland, Mich.). The following equation was used to obtain the results presented in FIGS.

$$P = \frac{V_{SPT} \times l}{\Delta p \times A \times \Delta t} \qquad \text{(Equation I)}$$

The local transport rate is expressed in terms of the corresponding volume of gas under standard pressure and temperature ($V_{SPT}$), that traverses the area (A) of a film during an elapsed time ($\Delta t$). The film has a thickness (l), and is under a pressure gradient ($\Delta p$) between the upstream and downstream faces. The value of $V_{SPT}$ is calculated directly from the number of moles n transformed to values at 0° C. and 1 atm. Many experimental techniques do not use a "gradient of pressure" as driving force for permeation, in the sense that both upstream and downstream pressures are in hydrostatic equilibrium with the atmospheric pressure. In such cases, the downstream side of the specimen is maintained at zero concentration of the permeant or 100% of an inert medium, and the upstream side is maintained at a controlled concentration of the permeant. If the upstream side of the specimen is in contact with pure permeant gas, then the driving force $\Delta p$ is a partial pressure difference that equals the ambient pressure. In gas permeation studies, pure permeant gas is used upstream, and a pure carrier gas to which the detection system is "blind" is used downstream. Therefore, all permeant detected downstream is attributed to permeation through the specimen. Water vapor permeation is a particular case where the concentration of the permeant is controlled by the upstream relative humidity, and a pure dry carrier gas is flushed downstream.

There are virtually endless ways to adapt Equation I to different permeation systems, and new techniques are proposed all the time (Crank, J. et al., [1968] "Diffusion in Polymers," Academic Press-London and New York), and references [(Pasternak, R. A. et al., [1970] Macromolecules, 3:366–371); (Compañ, V. et al., [1996] Polymer, 37(11):2243–2250); (Schult, K. A., et al., [1996] Journal of Applied Polymer Science, 61:1865–1876); (Hes, L. et al., [2000] Polymer Testing, 15(2):189–201); (Doroszewicz, S., [2000] Packaging Technology & Science, 9(2):111–120)]. The principle is always the same: generation of a known gradient of concentration of a diffusing species across a film specimen with controlled geometry, and monitoring of its passage by some detection device. The critical variables are always the quality of the specimen, purity of the materials, accuracy and stability of the detection system, and rigid control of leaks and other factors that might generate spurious signal. The materials and methods described herein are described in further detail in Lunardi, G. J., [2001] "Thermal and Permeation Properties of Poly(Ethene-Co-1-Alkene)s," Doctoral Dissertation, University of Florida, which is incorporated herein by reference.

Following are examples which illustrate procedures, including the best mode, for practicing the invention. These examples should not be construed as limiting. All percentages are by weight and all solvent mixture proportions are by volume unless otherwise noted.

EXAMPLE 1
Measurement of Oxygen Permeability

The OXTRAN 2/20 ST system is a partial pressure instrument that measures permeability coefficient of low barrier polymer films. Specimens having a surface area of 48.7 $cm^2$ were used, and the flow of both carrier and test gases were controlled independently to within 1% by needle valves. After an equilibration period, oxygen from the upstream side permeates through the film and is carried towards the COULOX sensor of the OXTRAN 2/20 by the nitrogen that flows continually downstream. The value of the D.C. output reading is directly proportional to the amount of oxygen permeated through the film. The conversion of the current to a numerical value of oxygen gas volume was set by calibration of the system with a standard film traceable to the National Institute of Standards and Technology (N.I.S.T.).

All results were obtained running the instrument in the following conditions: temperature: 23±0.1° C.; flow rate of carrier gas (nitrogen): 30±2% $cm^3$/min; flow rate of test gas (oxygen): 30±2% $cm^3$/min; flow rate of purging gas (nitrogen): 30±2% $cm^3$/min; rezero cycle: 3 (detector purged once when each cell has been tested three times); relative humidity of test gas: 0% R.H; relative humidity of carrier gas: 0% R.H.; conditioning time: 2 hours; and test time: 30 minutes. Because the test conditions can affect the results, tests were performed to evaluate the effect of the testing parameters on the permeation values obtained. An experimental design aimed at finding the most important parameters was prepared using the ECHIP software. Briefly, the results of the study showed that the flow rates of both the carrier gas and test gas were not significant variables and did not have an effect on the permeability values. However, the study did find an influence played by the re-zero cycle setting of the instrument, temperature of the test, and thickness of the film used. Therefore, the re-zero cycle was kept constant at all times. The temperature of the tests was kept constant within a very narrow range (23.0±0.1° C.). Thickness of the films was controlled in the processing step, and maintained at around 9 mils. It was only varied in the few cases when there was too little material to form normal thickness films.

EXAMPLE 2
Measurement of Water Vapor Permeability

Measurements of moisture permeation were done in a PERMATRAN W 3/31 (MOCON Instruments, Minneapolis, Minn.), an instrument that is very similar in its design to the OXTRAN 2/20 ST described above, except that it has three cells, two for samples and one for a reference film. The reference film was tested along with the unknowns for the purpose of continually checking the stability of the readings as compared to calibration values. The standard condition chosen in most tests was 100% R.H. In such cases, the liquid reservoir is not used, and only distilled water is employed to soak a sponge on the upstream side, setting the block temperature at 37.8° C. Therefore, this system uses a controlled relative humidity environment upstream, while maintaining a steady flow of dry nitrogen gas downstream. After an equilibration period, the moisture that permeates through the film sample is carried by the nitrogen flow to an infrared detection system. The value of the DC output is converted to a numerical value that is set by calibration of the system with a standard film traceable to the National Institute of Standards and Technology (N.I.S.T.).

The conditions during the water vapor permeation tests were: temperature: 37.8±0.1° C. Test time: 45 minutes; flow rate of carrier gas (nitrogen): 50±2% $cm^3$/min.; liquid used to produce moisture: distilled water; relative humidity in the upstream chamber: 100% R.H.; flow rate of purging gas (nitrogen): 50±2% $cm^3$/min.; rezero cycle: 3 (detector purged once when each cell has been tested three times); relative humidity of carrier gas upon entering the cell: 0% R.H.; and conditioning time: 2 hours. Both the OXTRAN 2/20 ST and the PERMATRAN 3/31 W instruments were connected to the same computer station, and were controlled by the same software (PERMNET). Each value of oxygen and water vapor permeation presented is the result of averaging at least 8 readings.

EXAMPLE 3
Measurement of $CO_2$, $N_2$, and $O_2$ Permeability with Pressure Driven System For measurements of carbon dioxide, and, in a few cases, oxygen and nitrogen, a permeation apparatus was built. The apparatus was designed to use the pressure-rise method [(Roger, C. E. et al., [1965] "Physics and Chemistry of the Organic Solid State," pp. 509–635, Interscience-New York); (Crank, J., [1975] "The Mathematics of Diffusion," 2nd Ed., Clarendon Press-Oxford)]. The pressure transducers were connected to a computer through an RS 232 interface in order to record the pressure level and stability at the upstream side, and the rise of pressure downstream with time. A HEISE 1000 psi pressure transducer, (precision: 0.05% of span), manufactured by Dresser Instrument Division (Stratford, Conn.) was used to monitor the upstream pressure.

Monitoring and recording of the downstream pressures was done using two independent transducers. The first was a 200 mmHg span HEISE absolute pressure transducer (precision: 0.05% of span), manufactured by Dresser Instruments Division (Stratford—Conn.); and the second a BARATRON absolute pressure capacitance transducer with 100 mmHg span (precision 0.1% of reading), manufactured by MKS Instruments (Andover, Mass.). The permeation cell was made out of a 316 stainless steel, machined block by TMR Engineering (Micanopy, Fla.). The RS 232-interfaced computer allowed recording of readings (e.g., time and pressure) every few seconds. After a few mmHg of pressure had built up downstream (typically between 2 and 20 mmHg), the test was interrupted. For each sample, this operation was repeated 2 more times, so that each permeation value was the average of three tests. The duration of each test depended primarily on the permeation properties of the film. Testing time varied from 2 hours to 24 hours. The data collected (pressures, elapsed time, and temperatures) by the computer was used to calculate the permeation data using Equation I.

The downstream volume was known and fixed (3424 $cm^3$); the geometry of the film specimen had been measured (the surface area was fixed at 25.652 $cm^2$), and the room temperature, as well as atmospheric pressure had been measured. The value $V_{SPT}$ was obtained from the number of moles of gas that permeated through the film, applying the ideal gas law (PV=nRT). In order that $V_{SPT}$ could be determined (from n) accurately, all pressures were measured downstream at low values, well within the range of applicability of the ideal gas law. The deviation caused by the application of ideal gas law at 1 bar was 0.07% for argon, 0.03% for nitrogen, and 0.6% for carbon dioxide. The deviation at 150 bar was 8% for argon and −2% for nitrogen (carbon dioxide was condensed at this pressure). The numbers indicate that the error introduced when one calculates the volumes of common gases by the ideal gas law is very small at 1 Bar (L'Air Liquide-Division Scientifique, [1976] "Propriétés Physiques des Gaz," Elsevier Scientific Publishing Company-Amsterdam). Therefore, since the experimental measurements were made below 50 mmHg (which is less than 0.07 Bar), the error associated to the "ideality" assumption is negligible.

EXAMPLE 4

Figure 4:
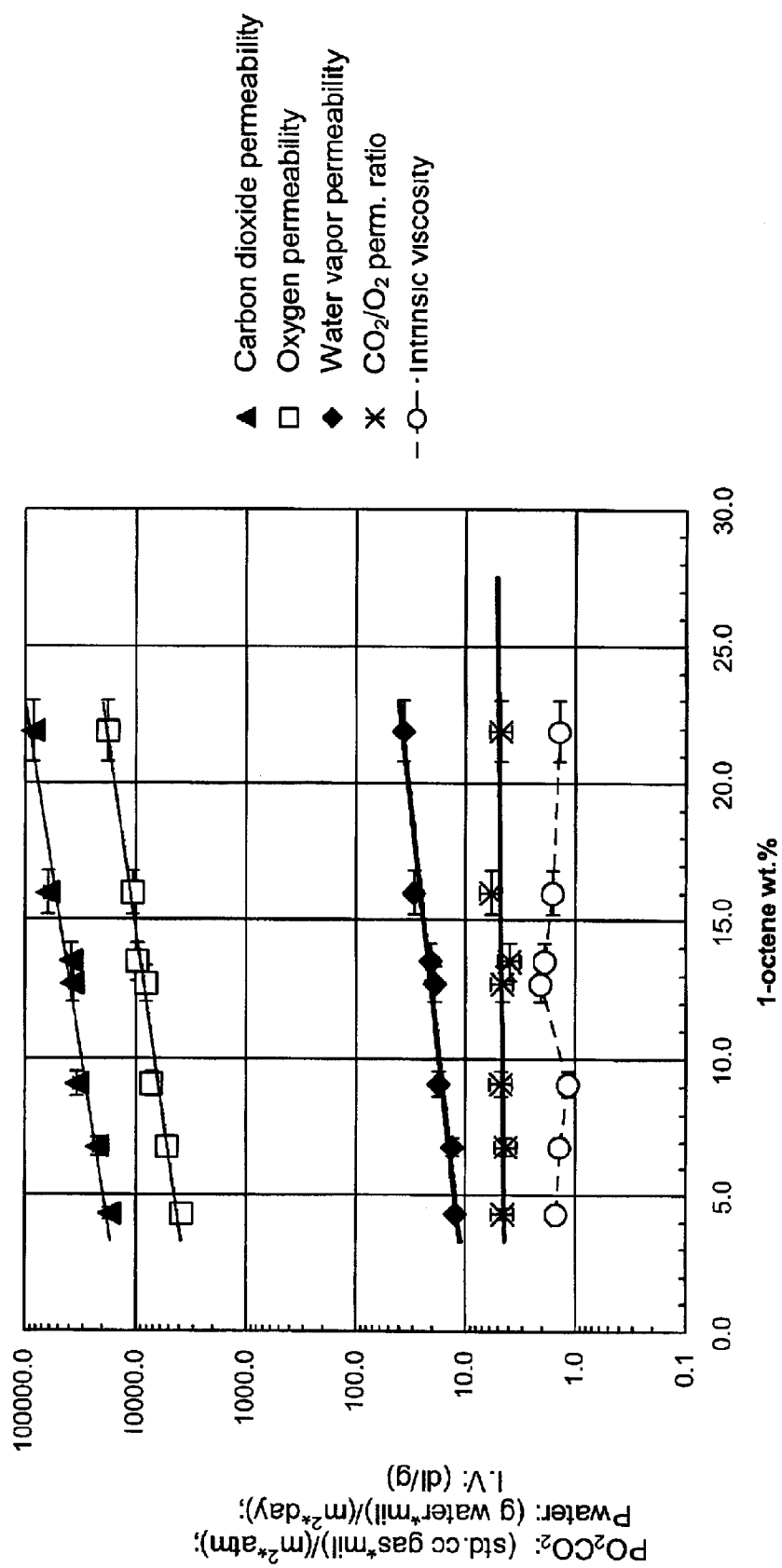
FIG. 4 shows the effect of comonomer content (wt. %) on the permeability of ethene-1-octene copolymers.
Figure 5:
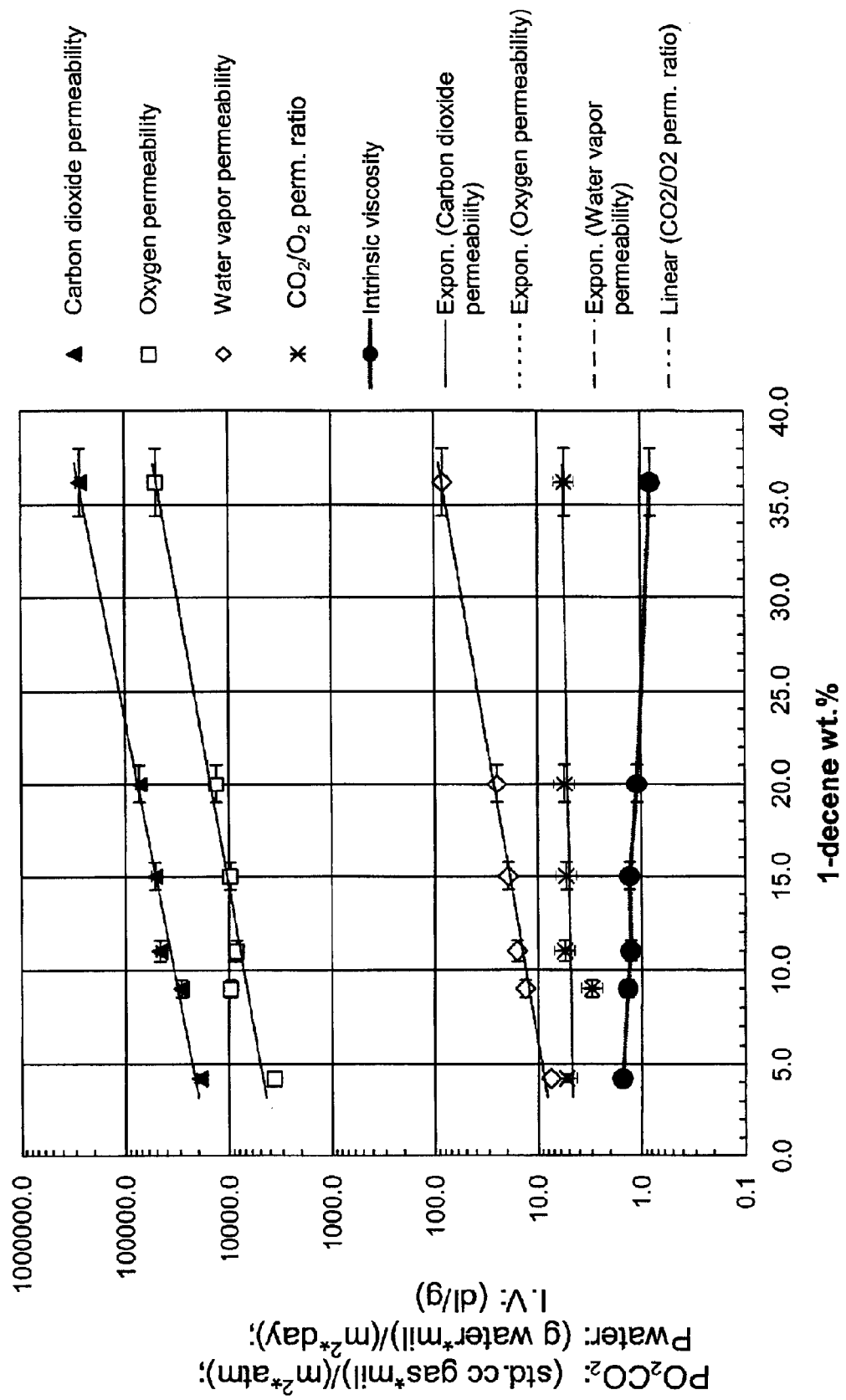
FIG. 5 shows the effect of comonomer content (wt. %) on the permeability of ethene-1-decene copolymers.

The effects of α-Olefin Monomer Content and Branch Length on Permeability Coefficient As can be seen in the plots of FIGS. 4 and 5, the increase in comonomer content causes an increase in all permeability coefficients (water vapor, oxygen and carbon dioxide), maintaining the ratio $P_{CO2}P_{O2}$ approximately constant between 4.0 and 5.0. The other possible ratios are not plotted to maintain the clearness of the graphs, but $P_{H2O}/P_{O2}$ and $P_{CO2}/P_{H2O}$ are also unaffected by the comonomer content or type. This was expected, since there are no structural features in the different comonomer structures to introduce differentiation in selectivity.

A close examination in some points of the composition vs. permeability graphs reveals that in some cases the permeability deviate from the logarithmic trend. Looking at the points indicating the respective intrinsic viscosity values for such cases, one can see that the slight variation could be attributed to differences in molecular weight from sample to sample. As the molecular weight decreases, the number of chain ends increases and vice-versa. Notwithstanding, the comonomer concentration is the main factor ruling the increase in permeability of gases in random copolymers. In a review on permeation properties of polymers, Naylor (Naylor, T. de V., [1988] *Comprehensive Polymer Science*, Vol. 2 Ch. 20, pp. 643–668) notes that the molecular weight effect may be important for the permeation of organic vapors (acetone, benzene, etc.) through polymers below $T_g$ because chain ends offer sites for permeant molecules to be absorbed into glassy polymers. However, in the permeation of atmospheric gases in polymers above $T_g$, the effect is not prominent, and is always much smaller than effects associated with crystallinity level and comonomer content (Amerongen, G. J. van, [1964] *Rubber Chemistry and Technology*, 37:1065–1152). Therefore, the general trend of increase in permeability seen in FIGS. 4 and 5 can be explained simply in terms of a decrease in the amount of crystalline material. To a lesser degree, the increase of permeability with comonomer content can also be attributed to a second contribution due to increase in the number of chain ends in the amorphous phase, which cause an increase in the free volume of the material.

Figure 6:
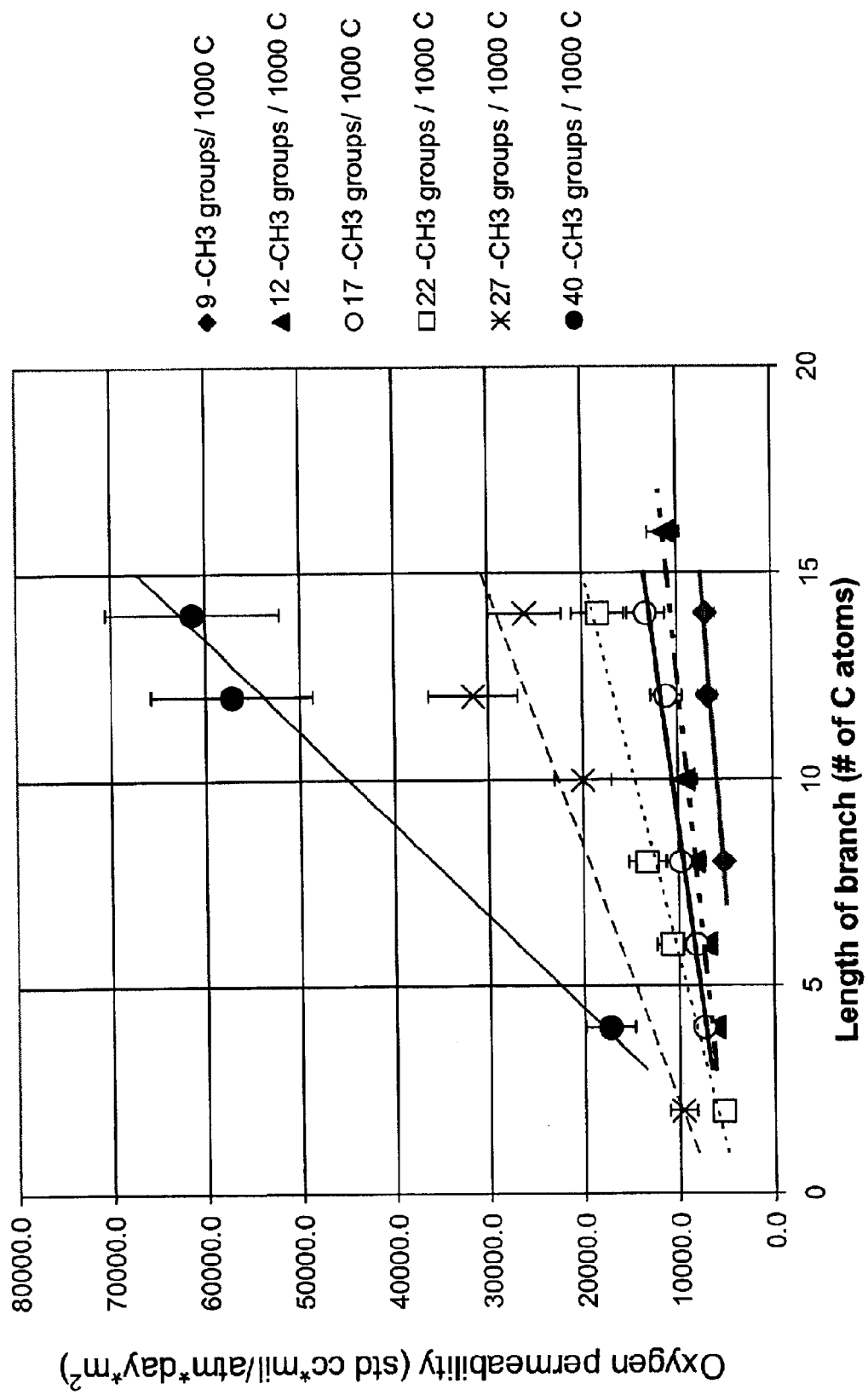
FIG. 6 shows the effect of branch length on the oxygen permeability coefficient of ethene and 1-alkene copolymers.
Figure 7:
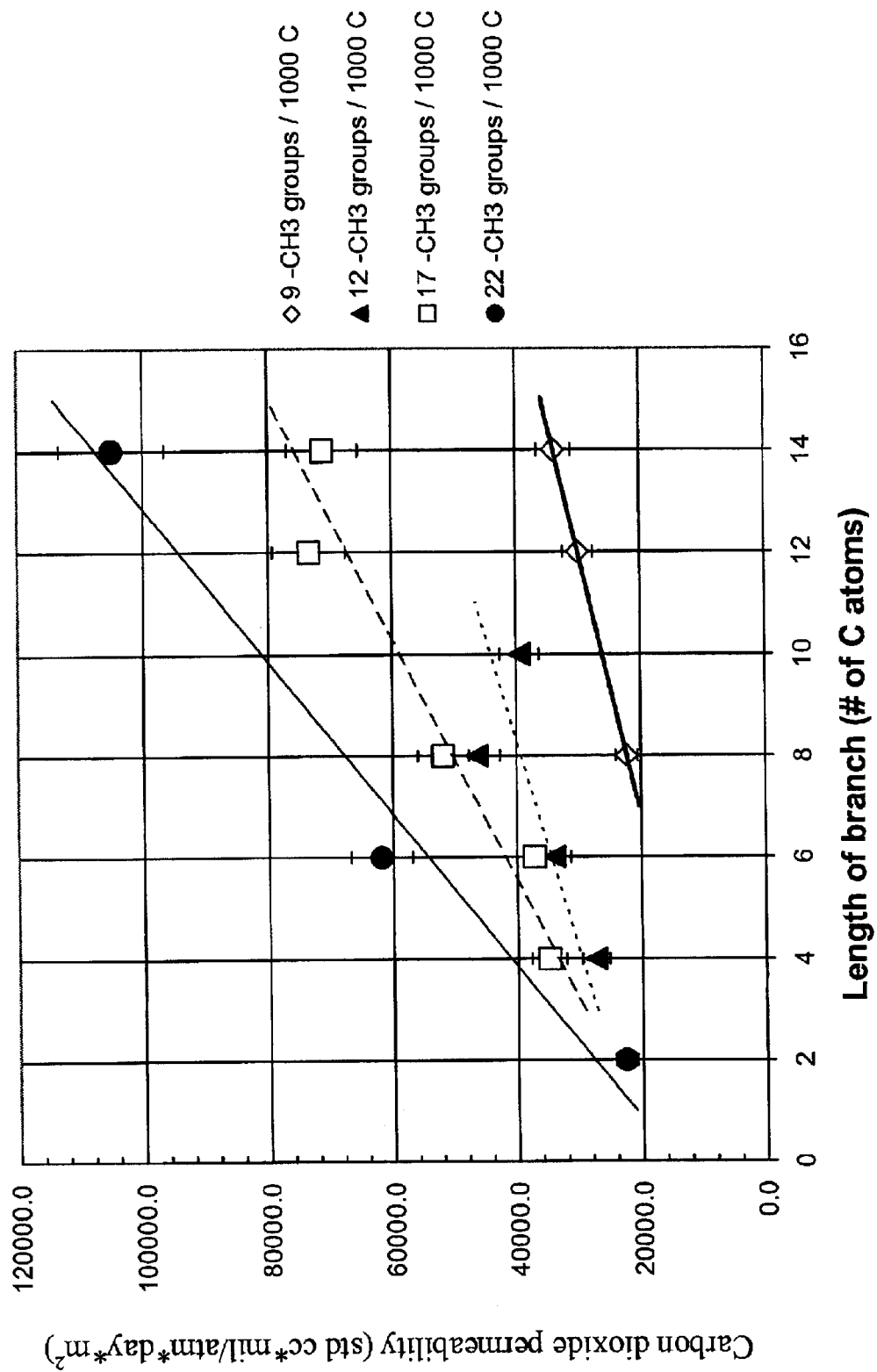
FIG. 7 shows the effect of branch length on the carbon dioxide permeability coefficient of ethene and 1-alkene copolymers.

A different perspective of the permeation values was obtained when the copolymers were grouped according to the number of branches (or methyl groups per 1000 carbon atoms in the main chain). This procedure generated the plots in FIGS. 6 and 7, showing respectively the permeability coefficient of oxygen and carbon dioxide as a function of the branch length. Each curve in the graphs of FIGS. 6 and 7 contains copolymers grouped according to the number of methyl groups/1000 carbon atoms in the main chain, but differing in the length of the branches to which the methyl groups are attached. The data show that the type of branch does play a role in the permeability coefficient of oxygen and carbon dioxide of these copolymers. It is apparent that the permeability increases not only with the molar fraction of comonomer, resulting in the general trend observed in FIGS. 4 and 5, but also with its branch type (e.g., branch length).

Although the general trend is the same for water vapor permeation (not shown) and carbon dioxide permeation (high methyl content curves not shown in FIG. 7), no significant correlation was detected for these cases. This may have been due to a tendency of water for immobilization and self-association, and ease to condense of carbon dioxide inside high amorphous content polymers.

Figure 8:
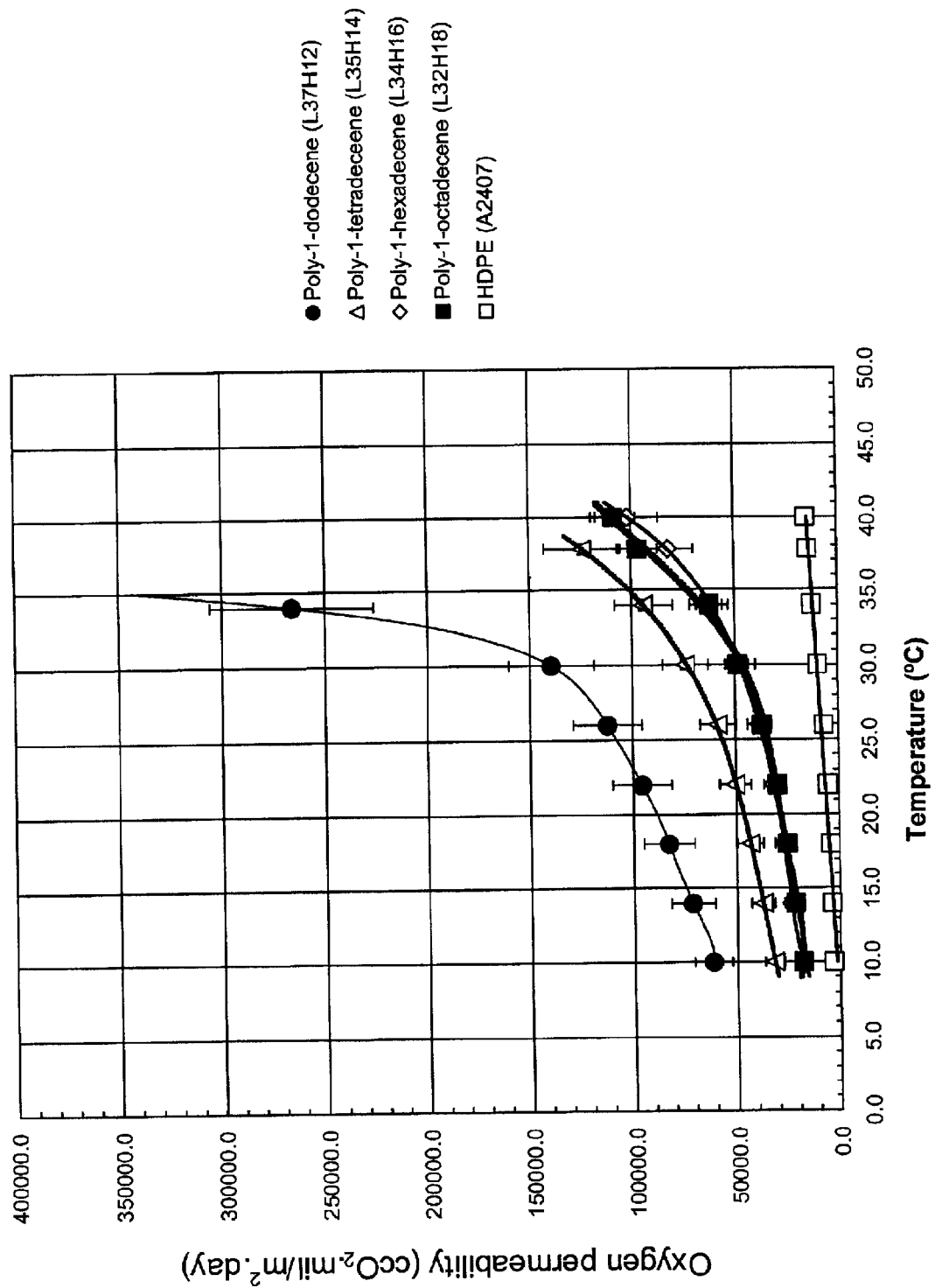
FIG. 8 shows the oxygen permeability coefficient of comb-structured 1-olefin homopolymers as a function of temperature.

Plotted in FIG. 8 are the values of oxygen permeability coefficients of comb-structured homopolymers poly(1-dodecene) through poly(1-octadecene). The data were obtained using the OXTRAN partial pressure system, previously described. Permeability values were measured at temperatures between 10° and 40° C. For comparison, the permeability coefficients of a high density polyethylene (PEAD 2407 A), which has less than 0.3% of methyl groups per 1000 carbon atoms, tested under the same conditions, were overlaid with the values of the comb-polymers (bottom curve). From the graph in FIG. 8, it can be seen that all the comb-polymers show higher permeability to oxygen than the unbranched sample over the entire temperature range, indicating as expected a more open structure in branched polymers. From the DSC results shown in FIGS. 1–3, it is evident that these comb-structured polymers are semicrystalline. Another feature is that the unbranched HDPE shows a modest, but steady, increase in the permeability coefficient, similar to the behavior of polymers that do not undergo any thermodynamic transition in the temperature interval. On their part, the branched polymers show a more accentuated dependence of $P_{O2}$ on T, accelerating the effect by the melting of the lateral chains. With melting, the crystalline phase is transformed into an amorphous phase.

Permeation measurements of water vapor, carbon dioxide and oxygen in poly(ethene-co-1-alkene)s is affected by the comonomer content, increasing with the amount of non-crystalline fraction. This is consistent with the known fact that diffusion occurs almost exclusively through the amorphous phases in semi-crystalline materials. However, when permeation coefficients of copolymers with the same molar content of branches are compared, the results indicate that the type of branch is also a factor. When branch lengths are placed in sequential order within a group of same molar content, a linear relationship emerges.

Branches have been shown to affect permeation rates in more ways than the known fact of preventing formation of densely packed crystalline phase, or creating more open amorphous regions. In the semi-crystalline copolymers examined, it has been shown that the bulkiness of the branch can have an effect of its own in enhancing diffusion rates. Then, although the pendant methyl groups are the main structural feature associated with increased free-volume in random olefin polymers, the methylene intermediate sections between the main chain and the methyl units are also important.

When comparing comb-structured polymers that exhibit side-chain crystallinity, there is apparently a reversal of the conclusion drawn in the previous paragraph, that is, the polymer structures with bulkier side chains are the ones with lower permeability. This apparent contradiction is explained by the fact that in a comb-homopolymer the side chains are not placed randomly anymore, and are in such a high concentration that they associate and fully crystallize on their own. Since the crystallization system is totally formed by side chains, the structures with larger amounts of crystallizable material are also those with longer side chains. Therefore, the corresponding effect on permeation rates is explained again by simple crystalline/amorphous ratio.

Crystalline phases, either formed by the conformational arrangement of main chain methylene units or by the association of crystallizable side chains, pose a higher barrier for the transport of diffusing molecules than amorphous phases lacking long range order. Based on the experimental results, an increase in permeation rates is seen when melting occur. However, it seems also the case that side-chain crystalline phases pose a lower barrier to permeation than crystalline regions formed by main chain segments.

What is claimed is:

1. A polymer material comprising a polyolefin, wherein said polyolefin comprises only hydrocarbons, wherein said polyolefin contains α-olefin as a monomer and ethylene as a comonomer, wherein said α-olefin is present within said polyolefin in an amount from about 50% to about 75% by weight, wherein said ethylene comonomer is present within said polyolefin in an amount from about 25% by weight to about 50% by weight, and wherein said polymer material exhibits temperature-sensitive permeability.

2. The polymer material, according to claim 1, wherein said α-olefin monomer is from about 4 carbon atoms to about 12 carbon atoms in length.

3. The polymer material, according to claim 1, wherein said α-olefin monomer is selected from the group consisting of 1-butene, 1-pentene, 1-hexene, 1-heptene, 1-octene, 1-nonene, 1-decene, 1-undecene, and 1-dodecene.

4. The polymer material, according to claim 3, wherein said α-olefin monomer is 1-dodecene.

5. The polymer material, according to claim 1, wherein the oxygen permeability of said polymer material increases at least about 1.5-fold over a temperature range of about 10° C., within the temperature range of about 0° C. to about 40° C.

6. The polymer material, according to claim 1, wherein the oxygen permeability of said polymer material increases at least about 2-fold over a temperature range of about 10° C., within the temperature range of about 0° C. to about 40° C.

7. The polymer material, according to claim 1, wherein the oxygen permeability of said polymer material increases at least about 3-fold over a temperature range of about 10° C., within the temperature range of about 0° C. to about 40° C.

8. The polymer material, according to claim 1, wherein said polymer material is a film.

* * * * *

UNITED STATES PATENT AND TRADEMARK OFFICE
CERTIFICATE OF CORRECTION

PATENT NO.    : 6,812,314 B2
DATED         : November 2, 2004
INVENTOR(S)   : Gilberto Joao et al.

It is certified that error appears in the above-identified patent and that said Letters Patent is hereby corrected as shown below:

Column 3,
Line 9, "cc-olefin" should read -- α-olefin --.

Column 10,
Line 21, "FIGS." should read -- Figures 4-8: --.

Column 13,
Line 24, "$P_{CO2}P_{O2}$" should read -- $P_{CO2}/P_{O2}$ --.

Column 15,
Line 13, "melting occur" should read -- melting occurs --.

Signed and Sealed this

Tenth Day of May, 2005

JON W. DUDAS
*Director of the United States Patent and Trademark Office*